Sept. 4, 1962   J. E. BARTLETT   3,052,257
REPLACEMENT STEMS FOR FAUCET ASSEMBLIES
Filed Oct. 12, 1959

INVENTOR.
Joseph E. Bartlett
BY
ATTORNEY.

United States Patent Office 3,052,257
Patented Sept. 4, 1962

3,052,257
REPLACEMENT STEMS FOR FAUCET
ASSEMBLIES
Joseph E. Bartlett, Olathe, Kans.
Filed Oct. 12, 1959, Ser. No. 845,694
4 Claims. (Cl. 137—315)

This invention relates to a replacement valve stem assembly for use in repairing leaky and badly worn shower faucets or the like and refers more particularly to an improved replacement assembly having features of construction which render it uniquely applicable to a wide variety of faucets of different manufacturers.

One of the important objects of my invention is to provide a single replacement assembly which is so constructed as to be capable of being coupled with faucet bodies having stem openings threaded either internally or externally. It is a particular feature of the invention in this respect that a single size replacement assembly can be successfully coupled with faucet bodies having stem openings of different diameters and depth of faucet body also. In other words, by virtue of the ready adaptability of the assembly to inside or outside threads and to openings in either case of differing diameters and depths it is possible to utilize my replacement assembly in a wide variety of faucet bodies of different manufacturers.

Another object of the invention is to provide a replacement valve stem assembly of the character described which is easily assembled with hidden faucet assemblies of the type generally employed in connection with bathtubs and showers. It is usual in such cases to conceal the valve fitting behind the wall structure adjacent the tub or in the shower, allowing only the stem and handle to protrude. Under most circumstances to replace the complete fitting requires tearing out portions of the wall and involves a rather substantial expense in again repairing the wall structure. However, my valve stem assembly can be easily coupled with the valve body by working through the limited size wall opening through which the valve stem extends, such an opening being normally provided during construction when the original equipment is put into the structure.

Another object of the invention is to provide a replacement valve stem assembly of the character described which by the nature of its construction cooperates with the valve body to provide a water-tight seal.

Still another object of the invention is to provide a replacement valve stem assembly in which the valve itself is uniquely constructed to prevent wear and tear on the valve gasket and to result in a positively indexed closed position for the faucet handle which does not shift during subsequent use.

Other and further objects of the invention together with the features of novelty appurtenant thereto will appear in the couse of the following description. In the accompanying drawings which form a part of the specification and are to be read in conjunction therewith and in which like reference numerals indicate like parts in the various views.

Figure 1:
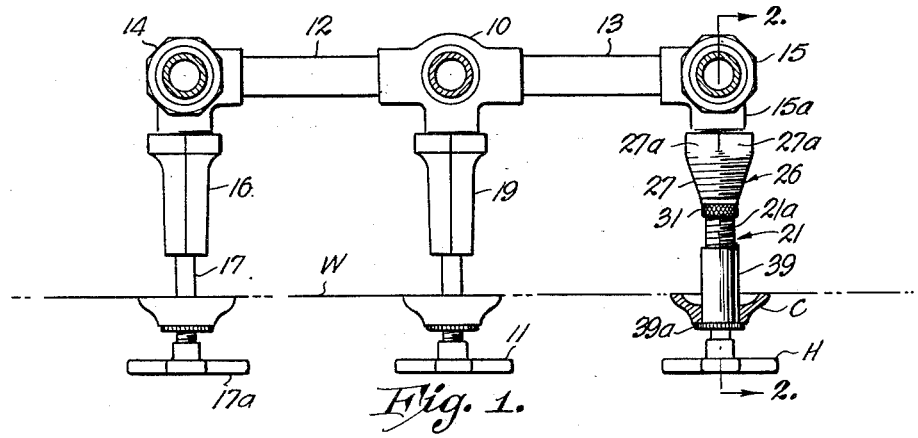
FIG. 1 is a top plan view through a typical shower fitting, the wall surface of the shower stall being shown by the broken line, and the right-hand valve body being equipped with a replacement assembly embodying the invention, the shower pipes and wall plate of the replacement assembly shown in section for purposes of illustration.

Referring to the drawings, in FIG. 1, I have shown a typical shower installation having a central mixing and water directing chamber 10 which is operated under control of the handle 11. Hot and cold water are supplied to this central chamber 10 through the conduits 12 and 13 which are respectively coupled with valve bodies or cocks 14 and 15. The valve body 14 is shown equipped with a typical cap nut 16 which forms a part of the original assembly and will be assumed to be in satisfactory operating condition. A valve stem 17 extends through the cap nut 16 and terminates outside the wall W in a handle 17a.

A similar cap nut 19 is provided on the mixing chamber 10. Since the parts thus far described play no part in my present invention, no further details will be given.

Figure 2:
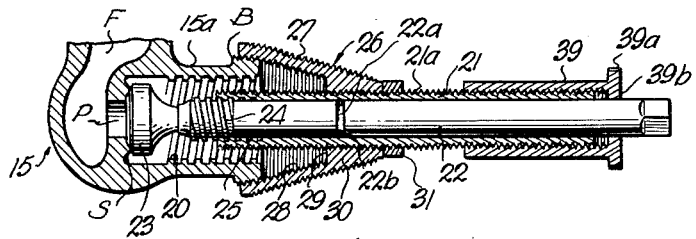
FIG. 2 is a sectional view on an enlarged scale taken generally along the line 2—2 of FIG. 1 in the direction of the arrows.

The valve bodies and mixing chamber of FIG. 1 are of the design wherein the cap nut is to be threaded externally on the stem nipple. Referring particularly to FIG. 2, it will be observed that the stem nipple 15a of valve body 15 is provided with a bossed end B threaded around its perimeter. The valve body itself is provided with a flow passageway F which communicates with a port P having an annular valve seat S. It is usual for the stem nipple 15a to be provided internally also with acme threads 20 which cooperate with the original valve stem (not shown) to produce axial movement of the stem upon rotation thereof. The stripping of these threads is one of the most frequent causes of valve failure. They are shown merely because they usually are a part of the original equipment.

The replacement assembly of my invention is illustrated in coupled condition with the valve nipple 15a in FIGS. 1 and 2. The handle H and wall plate C of FIG. 1 are not shown in FIG. 2. These are ordinarily part of the original equipment and can be reused, the handle being of the detachable type.

The assembly includes an elongate cylindrical sleeve 21 which is of an outside diameter substantially less than the minimum diameter nipple 15a with which it is to be used. Extending longitudinally through sleeve 21 is the valve stem 22 which terminates at its inner end in a valving member 23 of slightly greater diameter than the annular seat S. Adjacent the valving member 23 the stem is provided with external acme threads 24 which cooperate with internal threads 25 in the sleeve. It will be evident that rotation of the stem 22 relative sleeve 21 will produce axial movement of the stem, the direction of movement depending on the direction of rotation. The stem 22 is provided with a recess 22a which contains an O-ring 22b of any suitable resilient material such as rubber. The O-ring provides a sealing connection between the stem and interior of the sleeve yet permits axial movement of the stem relative the sleeve.

The external surface of the sleeve 21 is threaded throughout substantially its entire length by threads 21a.

Surrounding the sleeve 21 is a generally bell shaped connector member 26 having a conical and threaded outside surface 27 and a similarly tapered conical inside surface 28 which is also threaded. The inside conical surface 24 termiantes at its inner end in an annular shoulder 29 which also defines the end of a cylindrically apertured portion 30 threadedly coupled with the threads 21a of the sleeve. The large end of the bell shaped connector is provided on the outside surfaces with flats 27a arranged to form a hexagonal gripping surface which permits engagement with and rotation of the connector member by a standard deep socket wrench. A lock nut 31 is threaded onto sleeve 21 adjacent the connector. Preferably the lock nut has a circular periphery, knurled to assist in tightening it. The outside diameter of the lock nut is preferably equal to or slightly less than that of the small end of the connector.

Figures 3, 5:
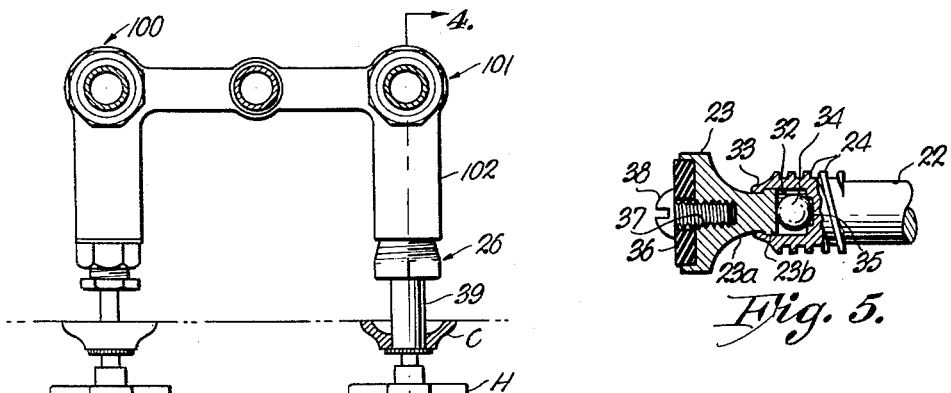
FIG. 3 is a view similar to FIG. 1 but showing the replacement assembly incorporating the invention coupled with a different typical fitting in which the stem opening of the valve body is internally threaded rather than externally threaded.
FIG. 5 is an enlarged longitudinal section through the valving member and adjacent end of the stem, and illustrating the manner of connection of the valving member with the stem.

As is best seen in FIG. 5 the valving member 23 is connected with stem 22 so as to be freely rotatable with respect thereto. The valving member includes a shank 23a provided at its inner end with a slightly larger diameter head 23b forming a shoulder extending radially from the shank. The head 23b is rotatably received in a counterbore 32, the end of the stem being swedged inwardly around the shank 23a as at 33 to prevent pull out of the shank. Interposed between the end face of head 23b and the base of the counterbore is a stainless steel ball 34. A shallow cylindrical recess 35 in the base of the counterbore serves to maintain the ball centered on the axis of rotation. The outer end of the valving member is provided with an annular washer or gasket 36 of compressible material, for example rubber. The washer is seated in a corresponding circular recess 37 in the valving member and is retained therein by a machine screw 38 which is screwed into a suitably tapped central aperture in the valving member.

Turning now to the other end of the assembly, the outer end of sleeve 21 has threaded thereon a cover plate retaining member 39 which takes the form of an internally threaded tube provided at one end with an outwardly projecting flange 39a and a headwall 39b apertured to loosely receive the stem 22 therethrough. It will be evident that by rotating the retaining member 39 relative the sleeve 21 the axial position of the retaining member with respect to the sleeve can be adjusted. The retainer member 39 serves the purpose of engaging and holding the cover plate C against the wall surface, the flange 39a engaging the outside surface of the plate adjacent the opening therein through which the stem extends. (See FIG. 1.) When the distance from the outside wall surface to the valve body is as shown the retaining member will be screwed down to a position comparable to that illustrated in FIG. 2. However, it can be backed off to a more extended position in case of fittings positioned at a greater distance from the wall, the only limiting factors being the length of the retaining member and the length of the stem. I find that a range of adjustment of approximately one inch provides sufficient flexibility to accommodate the assembly to practically all installations.

Returning now to the bell shaped connector member 26, the conical internal threaded surface 28 provides the means of accommodating the assembly to valve bodies having externally threaded stem openings of differing diameters. As will be evident, should the outside diameter of the threaded portion 16 of the nipple be less than illustrated, the engagement of the internally threaded surface 28 therewith will be further along toward the inner end of said surface. I have discovered that by using a cone angle of from 10° to 15° and a No. 18 thread, good engagement can be secured with outside nipple diameters ranging from ¾ inch to 1⅛ inch.

As has been earlier mentioned, one of the important and advantageous features of my invention is that it provides a valve stem assembly which is capable of use in connection with fittings having stem nipples which are interiorly threaded rather than exteriorly threaded. An internally threaded arrangement of typical design is illustrated in FIGS. 3 and 4.

As shown in FIG. 3, the left-hand valve body 100 incorporates the original parts supplied with the fitting while the right-hand valve body 101 has coupled therewith my replacement valve assembly.

Figure 4:
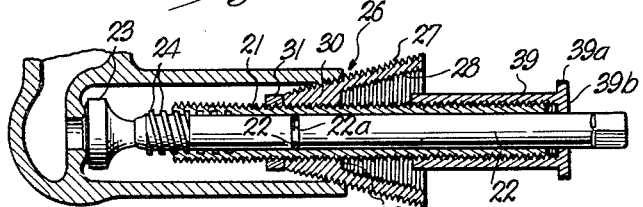
FIG. 4 is a sectional view on an enlarged scale taken generally along the line 4—4 of FIG. 3 in the direction of the arrows.

As will be more readily apparent from FIG. 4, the nipple 102 of valve body 101 differs from the nipple shown in FIG. 2 in that the threads at the open end of the nipple are located internally rather than externally. My valve assembly is rendered capable of operation with this type of design by simply reversing the position of the connector 26 on the sleeve 21 so that the small end of the connector member is nearest the valving member 23. As will be evident, it is now the threads on the exterior conical surface 27 of the connector which provide the necessary coupling engagement. The taper and thread size of the exterior surface 27 is like that of the inside surface 26, as is the range of diameters, i.e., from an approximate minimum outside diameter of about ¾ inch at the small end to approximately 1⅛ inch at the base of the hexagonal flats 27a. The locus of engagement of the external threads of the connector with the internal threads of the nipple will, of course, depend upon the inside diameter of the latter.

Reversal of the connector with respect to sleeve 21 is easily accomplished. Prior to connecting the handle with the stem, the retainer 39 is backed completely off and detached from sleeve 21, as is the lock nut 31. This permits the connector member in turn to be backed off and removed in like manner, and rethreaded on the sleeve in the orientation desired. The lock nut and retainer are then again connected with the sleeve, the lock nut in this case going on the sleeve ahead of the connector member, as shown in FIG. 4. If small enough, the lock nut may alternatively be positioned against the shoulder 29, inside the bell.

The manner of installation of the assembly with the valve body is the same with either type of fitting. Initially, stem 22 is rotated in the sleeve 21 to expose a substantial length of the threads 24. The connector 26 is backed away from the valve end of the assembly sufficiently far to permit insertion of the assembly to its full depth in the valve body with the valving member engaging its seat. The sleeve 21 is then held firmly while at the same time screwing the connector down on the sleeve toward the nipple until its threads lightly contact the threads of the nipple. This properly indexes the connector on the sleeve. The assembly is thus withdrawn from the body, and the lock nut tightened against the connector. The stem is now turned to back the valving member 23 toward the sleeve, and the assembly again replaced, as before. Without the interference of the valving member against the seat, it is now possible to screw the connector onto the threads of the valve body. Tightening of the connector on the nipple can be accomplished with the usual deep socket which can be inserted through the usual wall opening surrounding the stem. The wall plate is then placed in position on the outside of the wall and the retainer 39 inserted therethrough and tightened down firmly. Finally, the handle is coupled with the exposed end of the stem. The repaired faucet is now ready for operation.

It may be desirable to daub the threads of the nipple with a suitable calking substance before coupling of the connector therewith. However, I have found that an adequate seal can be obtained by using relatively soft brass as the material for the connector or by making the connector of a resilient but deformable plastic, for example nylon, polyethylene or the like.

The free swiveling of the valve member 23 to the stem insures that the only resistance to turning of the stem will be that encountered between the threads 24 and 25, and insures that the washer 36 will not be subjected to rotary frictional wear at the seat when contact is established.

From the foregoing it will be seen that this invention is one well adapted to attain all of the ends and objects herein above set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A replacement valve stem assembly for faucets of the type having a tubular valve body open at one end and provided with an internal axially oriented valve seat at the other, said assembly comprising a sleeve of lesser outside diameter than the inside diameter of the valve body adapted to be inserted centrally into the valve body with a substantial portion extending outwardly from the opening, a connector member encircling said sleeve, interengaging threads on said connector member and sleeve whereby to provide for adjustment of the connector member axially of said sleeve and said sleeve and connector member so constructed that the connector member can selectively be disengaged from said sleeve and reversed thereon, said connector member having a bell shape with conical, threaded exterior and interior surfaces coaxial with said sleeve and converging toward their respective apices in the same axial direction and operable to selectively interfit with the valve body upon reversal of the orientation of the connector member on said sleeve, a valve stem extending through said sleeve and provided at one end with a valving member for engagement with said seat, and a threaded connection between said stem and sleeve whereby rotation of said stem causes axial movement thereof within said sleeve.

2. A replacement valve stem assembly as in claim 1 including means for releasably locking said sleeve against movement away from said valve body relative said connector member.

3. A universal replacement valve stem assembly adapted for connection with inside or outside threaded valve bodies comprising a sleeve dimensioned for insertion centrally into the valve body, a connector member threaded onto the exterior of said sleeve for adjustment lengthwise thereof and removal therefrom whereby the orientation of the connector member on the sleeve may be selectively reversed, said connector member having coaxial, threaded conical surfaces converging toward their respective apices in the same axial direction providing the connector with a bell shape in which the threaded connection with the sleeve is at the small end of the bell, a valve stem rotatably supported in said sleeve and having threaded connection therewith whereby rotation of said stem in said sleeve causes axial movement of the stem relative the sleeve, and a valving member connected with said stem.

4. A replacement valve assembly as in claim 3 including a longitudinally extensible retaining member threadedly connected with that end of said sleeve opposite from said valve body.

References Cited in the file of this patent

UNITED STATES PATENTS

| 1,774,196 | Davis | Aug. 26, 1930 |
| 2,451,928 | Doerr | Oct. 19, 1948 |

FOREIGN PATENTS

| 180,014 | Great Britain | 1922 |